US010055137B2

(12) United States Patent
Madraswala et al.

(10) Patent No.: US 10,055,137 B2
(45) Date of Patent: Aug. 21, 2018

(54) METHOD, SYSTEM, AND APPARATUS FOR NESTED SUSPEND AND RESUME IN A SOLID STATE DRIVE

(71) Applicant: INTEL CORPORATION, Santa Clara, CA (US)

(72) Inventors: Aliasgar S. Madraswala, Folsom, CA (US); Yogesh B. Wakchaure, Folsom, CA (US); David B. Carlton, Oakland, CA (US); Xin Guo, San Jose, CA (US); Ryan J. Norton, Cameron Park, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/197,617

(22) Filed: Jun. 29, 2016

(65) Prior Publication Data

US 2018/0004410 A1 Jan. 4, 2018

(51) Int. Cl.
*G06F 12/02* (2006.01)
*G06F 3/06* (2006.01)

(52) U.S. Cl.
CPC ............ *G06F 3/061* (2013.01); *G06F 3/0659* (2013.01); *G06F 3/0688* (2013.01)

(58) Field of Classification Search
None
See application file for complete search history.

(56) References Cited

U.S. PATENT DOCUMENTS 6,041,354 A * 3/2000 Biliris .................. G06F 9/4887
348/E7.073
2007/0239926 A1* 10/2007 Gyl ....................... G11C 7/1075
711/103

* cited by examiner

*Primary Examiner* — Duc Doan
(74) *Attorney, Agent, or Firm* — Konrad Raynes Davda & Victor LLP; Rabindranath Dutta (57) ABSTRACT

A first type of command is suspended, by a controller of a non-volatile memory device, in response to determining that a second type of command is waiting for execution. The first type of command is split into a plurality of chunks based on a computed criteria. A second type of command is executed in between execution of at least two chunks of the first type of command.

24 Claims, 11 Drawing Sheets

Nested suspend status handling

| Description | SR[7] | SR[2] | SR[0] |
|---|---|---|---|
| Program suspended successfully | 1 | 1 | X |
| Program operation completed with pass status (suspend was ignored) | 1 | 0 | 0 |
| Program operation completed with fail status (suspend was ignored) | 1 | 0 | 1 |
| Program or erase operation while NAND in nested suspend state | 0 | X (invalid) | 0 |
| Invalid status | 0 | 1 | 1 |
| Invalid status | 0 | 1 | 1 |
| Invalid status | 1 | 1 | 1 |

902 / NAND remains in nested suspend state

METHOD, SYSTEM, AND APPARATUS FOR NESTED SUSPEND AND RESUME IN A SOLID STATE DRIVE

BACKGROUND

A solid state drive (SSD) is a data storage device that uses integrated circuit assemblies as memory to store data persistently. SSDs have no moving mechanical components and this distinguishes SSDs from traditional electromechanical magnetic disks, such as, hard disk drives (HDDs) or floppy disks, which contain spinning disks and movable read/write heads. Compared to electromechanical disks, SSDs are typically more resistant to physical shock, run silently, have lower access time, and less latency.

Many types of SSDs use NAND-based flash memory which retains data without power and comprise a type of non-volatile storage technology. Quality of Service (QoS) of an SSD may be related to the predictability of low latency and consistency of high input/output operations per second (IOPS) while servicing read/write input/output (I/O) workloads. This means that the latency or the I/O command completion time needs to be within a specified range without having unexpected outliers. Throughput or I/O rate may also need to be tightly regulated without causing sudden drops in performance level.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

A requirement of SSDs may be to ensure that commands are serviced in a reliable amount of time, and the metric for performance may be provided by the QoS metric. One challenge associated with improving the QoS is that because write commands and erase commands take much longer to complete than read commands due to non-volatile memory (e.g., NAND) access, when there are multiple commands outstanding in a SSD it is possible for reads to get stuck behind writes and/or erases resulting in a longer than usual delay. This may happen some of the time, but the variation in read command service time may result in a poor QoS.

Certain embodiments provide write suspends and piecewise erases that allow write and/or erase commands to be suspended to allow reads through, to improve QoS. For improvement in QoS, a policy may be provided to invoke write suspends in the right situations. Certain embodiments may also allow "nested" suspensions of writes and resumption of writes via a suspend/resume policy that optimizes the overall QoS.

Suspending a write to allow reads through to improve QoS may be detrimental towards maintaining good overall average bandwidth due to extra overhead associated with performing the suspend. In certain embodiments, a determination is made as to when suspends may be performed in a way that does not compromise performance, and conversely when a tradeoff is necessary. The effect is quantified based on the utilization of resources, and this is then used to decide how often and when write suspends are to be performed.

In certain situations, in order to achieve optimal QoS, this policy may call for write and erase commands to be completed over a long period of time to allow many reads through, over many overlapping suspend and resume cycles. If a write cannot be suspended at the same time as an erase, however, it may not possible to achieve the desired policy. Certain embodiments provide the capability to allow for nested writes and erases to be suspended together.

Figure 1:
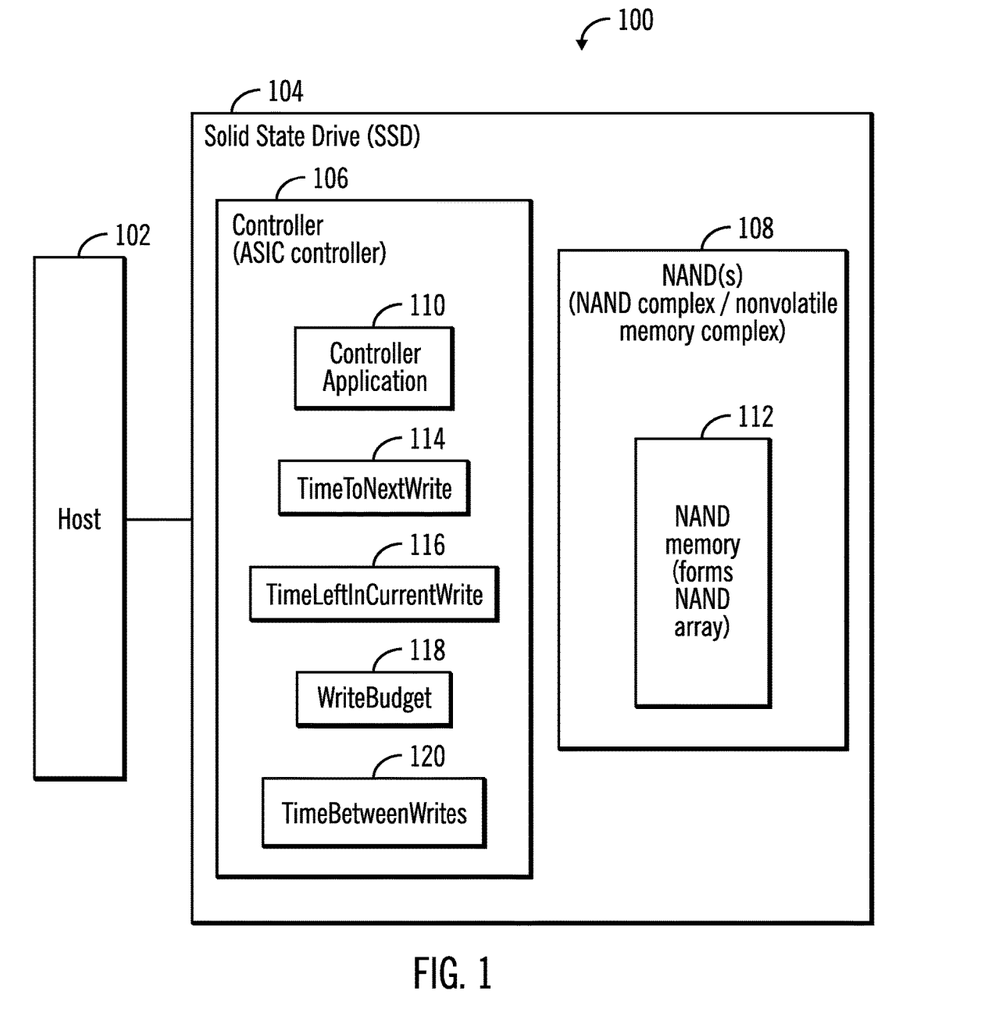
FIG. 1 illustrates a block diagram of a computing environment in which a host performs read and write operations on a SSD, and where erase operations are performed within the SSD, in accordance with certain embodiments.

FIG. 1 illustrates a block diagram of a computing environment 100 in which a host 102 reads and writes data stored in a non-volatile memory in a SSD 104, and the SSD 104 may internally perform erases, in accordance with certain embodiments. The SSD 104 may be comprised of a controller 106 and a NAND complex 108, where in certain embodiments the NAND complex 108 may be a Triple Level Cell (TLC) NAND or any other type of NAND [e.g., Single Level Cell (SLC), Multi Level Cell (MLC), Quad Level Cell (QLC), etc.] or any other type of non-volatile memory complex. In other embodiments the SSD 104 may be comprised of a controller 106 that controls certain other types of non-volatile memory, such as NOR memory or some other suitable non-volatile memory. Non-volatile memory is a storage medium that does not require power to maintain the state of data stored by the medium. Nonlimiting examples of nonvolatile memory may include any or a combination of: solid state memory [such as planar or three Dimensional (3D) NAND flash memory or NOR flash memory], 3D crosspoint memory, storage devices that use chalcogenide phase change material (e.g., chalcogenide glass), byte addressable nonvolatile memory devices, ferroelectric memory, silicon-oxide-nitride-oxide-silicon (SO-NOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistor-less stackable cross point architecture in which memory cells sit at the intersection of words lines and bit lines and are individually addressable and in which bit storage is based on a change in bulk resistance. In certain embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org). In certain embodiments, the SSD 104 may be capable of storing several terabytes of data or more, and the NAND complex 108 may be comprised of a plurality of NAND memory 112 that may form a NAND array.

In certain embodiments, the host 102 may be comprised of any suitable computational device, such as a personal computer, a mainframe, a telephony device, a smart phone, a storage controller, a blade computer, a processor with memory, etc. In certain embodiments, the host 102 may communicate with the SSD 104 over a bus (such as a Peripheral Component Interconnect (PCIe), Serial Advanced Technology Attachment (SATA), Serial Attached Small Computer System Interface (SAS)) or a network, such as the Internet, a storage area network (SAN), a local area network (LAN), etc.

In certain embodiments, a software application in the host 102 sends read and/or write commands to the SSD 104 via an interface [e.g., a storage controller interface, such as, Serial Attached Small Computer System Interface (SAS), Serial AT Attachment (SATA), Peripheral Component Interconnect Express (PCIe), Non-Volatile Memory Express (NVMe), etc.] that couples the host 102 to the SSD 104. Certain embodiments relate to the execution of the read and/or write commands in the SSD 104 after the SSD 104 receives the read and/or write commands from the host 102 over the interface. In certain embodiments, a controller application 110 (implemented in firmware, software, hardware or any combination thereof) that executes in the controller 106 of the SSD 104 receives the read and/or write commands from the host 102, and then the controller application 110 executes the read and/or write with respect to the NAND complex 108 by converting the read and/or write commands received from the host 102 into memory operations. The controller 106 may also execute erase commands with respect to the NAND complex 108. The controller 106 and the controller application 110 may be implemented in Application Specific Integrated Circuit (ASIC) and/or firmware, software, or any combination thereof.

The controller application 110 may utilize various parameters indicated via reference numerals 114, 116, 118, 120. The parameters 114, 116, 118, 120 may include variables such as a such a TimetoNextWrite 114, a TimeLeftInCurrentWrite 116, a WriteBudget 118, a TimeBetweenWrites 120, etc.

Therefore, FIG. 1 illustrates certain embodiments in which a controller application 110 services read and/or write commands received from the host 102 and executes erase commands, while trying to optimize the quality of service for completing the read, write, and erase commands in the SSD 104.

Figure 2:
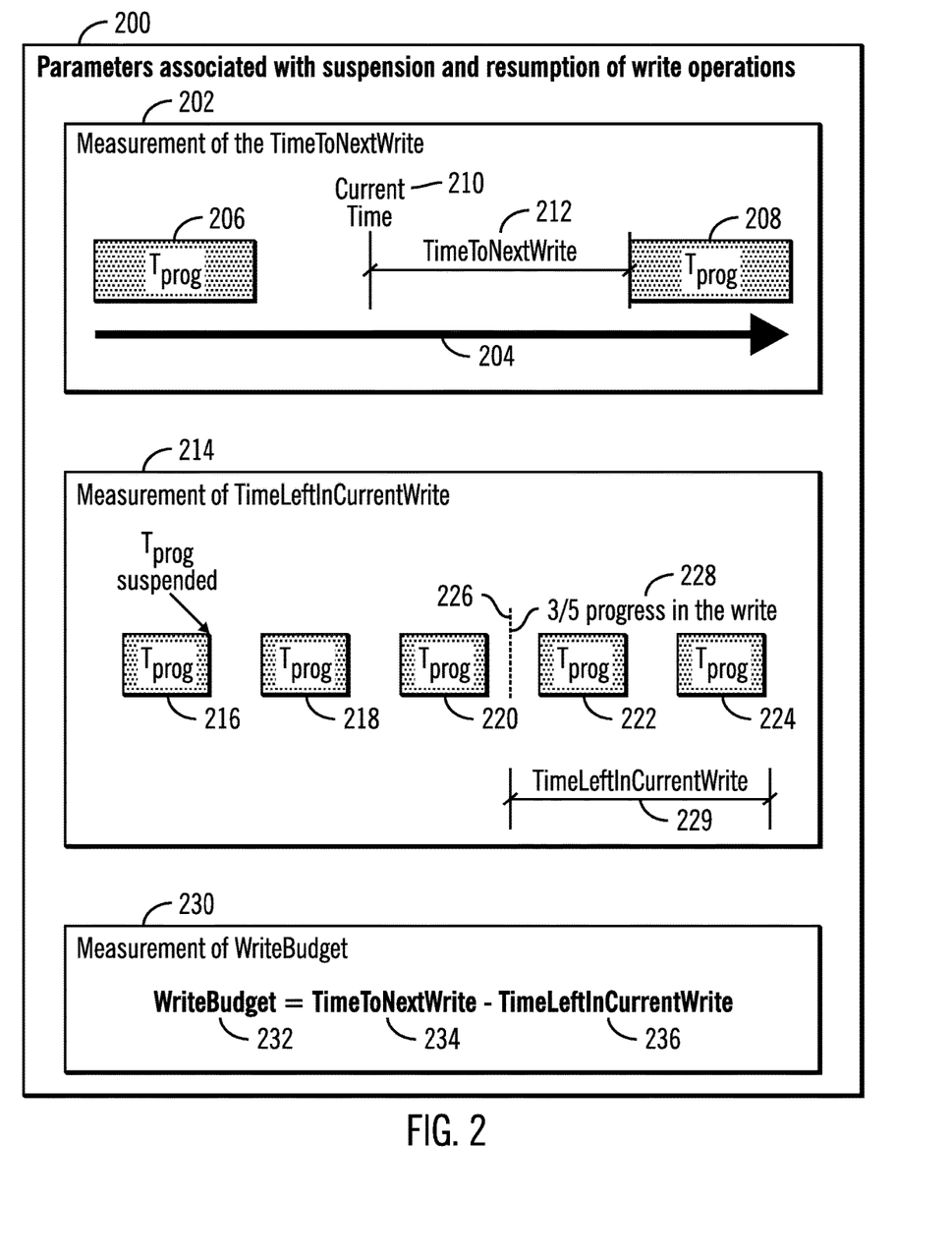
FIG. 2 illustrates a block diagram that shows parameters associated with suspension and resumption of write operations in a SSD, in accordance with certain embodiments.

FIG. 2 illustrates a block diagram 200 that shows parameters associated with suspension and resumption of write operations in a SSD, in accordance with certain embodiments.

Write commands may arrive at various intervals from the host 102 to the SSD 102, and block 202 shows the measurement of the TimeToNextWrite parameter. In certain embodiments, the TimeToNextWrite parameter may be estimated based on measurements made in SSD workloads in the past, where the measurements may be used to predict the frequency of writes the host 102 is likely to send to the SSD 104.

In FIG. 2, the progress of time is shown by reference numeral 204. The time to perform a write into NAND memory may be referred to as $T_{prog}$. A write shown by $T_{prog}$ 206 is performed by the controller 106. The controller 106 waits for the next write that is indicated by $T_{prog}$ 208 to be performed, and the current time is shown via reference numeral 210. The time interval between the current time 210 and the next write (i.e., $T_{prog}$ 208) is referred to as the TimeToNextWrite 212.

A write may be performed by splitting the write into a plurality of write "chunks" (as shown in block 214 and also referred to as "chunks"). For example $T_{prog}$ 206 may be broken down into 5 write chunks shown via reference numerals $T_{prog}$ 216, $T_{prog}$ 218, $T_{prog}$ 220, $T_{prog}$ 222, $T_{prog}$ 224, where $T_{prog}$ 216 is the first write chunk and $T_{prog}$ 224 is the last write chunk. At the time instant denoted via reference numeral 226, it is shown via reference numeral 228 that ⅗ fraction of the write has been completed, and therefore ⅖ fraction of the write has yet to be completed. An estimate may be made of the time and/or the number of clock pulses needed to complete the write, and this estimate for the remainder of the write to be completed is referred to as the TimeLeftInCurrentWrite 229. It should be noted that the write is a NAND write command and is not a standard PCIe write command. The write is an internal write to the NAND media. For example, NAND Flash can only be written to at a page level granularity. This means that several smaller PCIe write commands may be combined into one NAND write command.

A parameter for determining when to suspend/resume write commands and minimizing performance impact is the write budget that is indicated by the parameter "WriteBudget", and the measurement of WriteBudget is shown in block 230. Write budget is the extra time between successive writes to a particular die that may be used to absorb write suspend overheads and reads, where a die in the context of a SSD is a small block of semiconducting material on which a functional circuit is fabricated. The die may be a non-volatile memory, where there are multiple non-volatile memory units that are managed and written to by the controller 106. The WriteBudget 232 may be the difference between the TimeToNextWrite 234 and the TimeLeftInCurrentWrite 236 (as shown in block 230).

Figure 3:
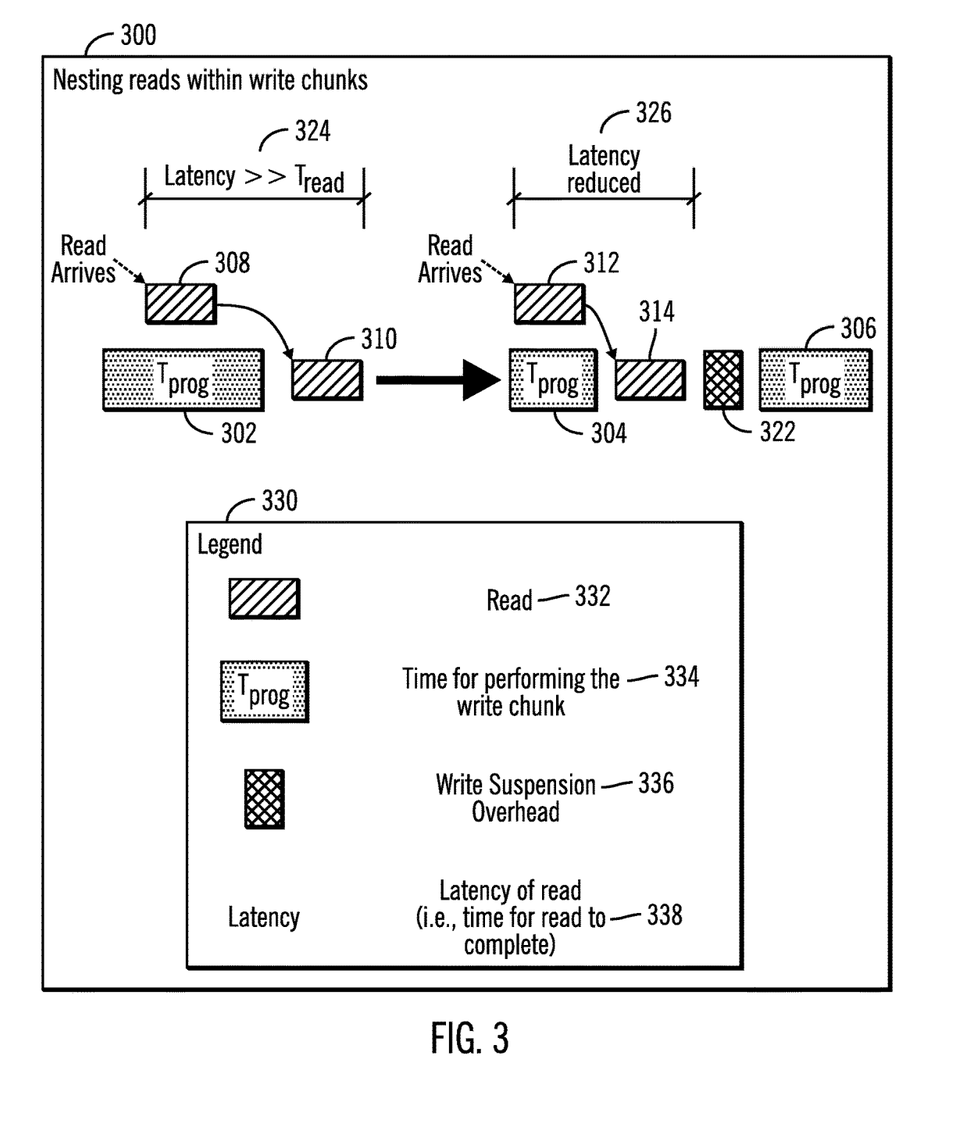
FIG. 3 illustrates a block diagram that shows nesting reads within writes, in accordance with certain embodiments.

FIG. 3 illustrates a block diagram 300 that shows the nesting of reads within write chunks, in accordance with certain embodiments. In FIG. 3, a legend 330 indicates the shadings and nomenclatures used for reads 332, write chunks 334, write suspension overheads 336, and the latency of reads (i.e., the time for a read to complete) 338.

With the parameters associated with the suspension and resumption of write operations defined, an optimal suspend/resume policy for writes may be implemented in certain embodiments. The policy may be determined by the back end utilization of the NAND memory modules in the SSD 104. If the NAND (in this context, NAND memory cells) is not completely utilized (i.e. processes are not "NAND limited") the SSD 104 is not running at its full potential (for example, due to a small "queue depth" or a different bottleneck elsewhere in the system). In these cases there is ample "write budget" to absorb the impact of write suspends and a simple suspend policy may be utilized. When a read arrives, the SSD 104 suspends the performing of the write substantially immediately and resumes the performing of the write when there are no more reads to be performed or when there is not enough write budget.

On the other hand, if the system is NAND limited, the SSD 104 will necessarily have to trade off some performance for improved QoS. The system is NAND limited when the SSD is limited by the bandwidth of its non-volatile memory as opposed the host interface or some other controller resource. In certain embodiments, the write operation that is in progress is broken up into small chunks and trickled out over time and reads are performed preferentially before the write operation completes. The more chunks (i.e., portions of a write) that a write is broken into, the better the overall QoS can be because the time to complete an individual chunk is smaller. However, the more chunks there are, the greater the impact on performance because each chunk has extra overhead associated with it. A command cannot be stopped instantaneously. The controller must send a signal to suspend the command and the NAND must respond to the signal. Similarly starting a command takes time. This is the origin of the extra overhead. The more chunks that a command is broken into, the more the overhead. The controller application 110 may calculate the achievable back end performance capabilities without write suspend, as well as what the back end performance would be with a variable number of suspends, while taking into account performance degradation due to suspend overheads. These two calculations are used to solve for the number of suspends possible given an allowable performance degradation. The SSD 104 may suspend writes being performed this calculated number of times spaced out over TimeBetweenWrites 120, where the TimeBetweenWrites 120 refers to the time between the performing of two consecutive writes.

The latency of a read refers to the time taken to complete execution of a read operation. If a read operation has to wait until an entirety of a write is complete, the latency of the read operation is very high. However, by splitting a write into chunks and executing reads in between the chunks the latency of reads is reduced.

In FIG. 3, when a write 302 is being executed, a read 308 arrives and the read is executed (reference numeral 310) after the completion of the write 302. In such a case, the latency of the read is very high as shown via reference numeral 324 because the entirety of the write 302 is completed before executing the read. Thus the latency of the read is much greater than the actual number of clock cycles during which the read is being executed (indicated as $T_{read}$).

In FIG. 3, in another embodiment, a read 312 arrives when the write chunk 304 is being executed and the read is executed (reference numeral 314) prior to execution of the write chunk 306. An exemplary write suspension overhead 322 is also shown in FIG. 3. In such embodiments, a write is split into a plurality of write chunks 304, 306 and reads are performed in between the execution of the write chunks. The latency of the reads is reduced (in comparison to that shown via reference numeral 324) as shown via reference numeral 326. By splitting a write into chunks 304, 306 and executing reads in between the chunks the latency of reads is reduced.

Figure 4:
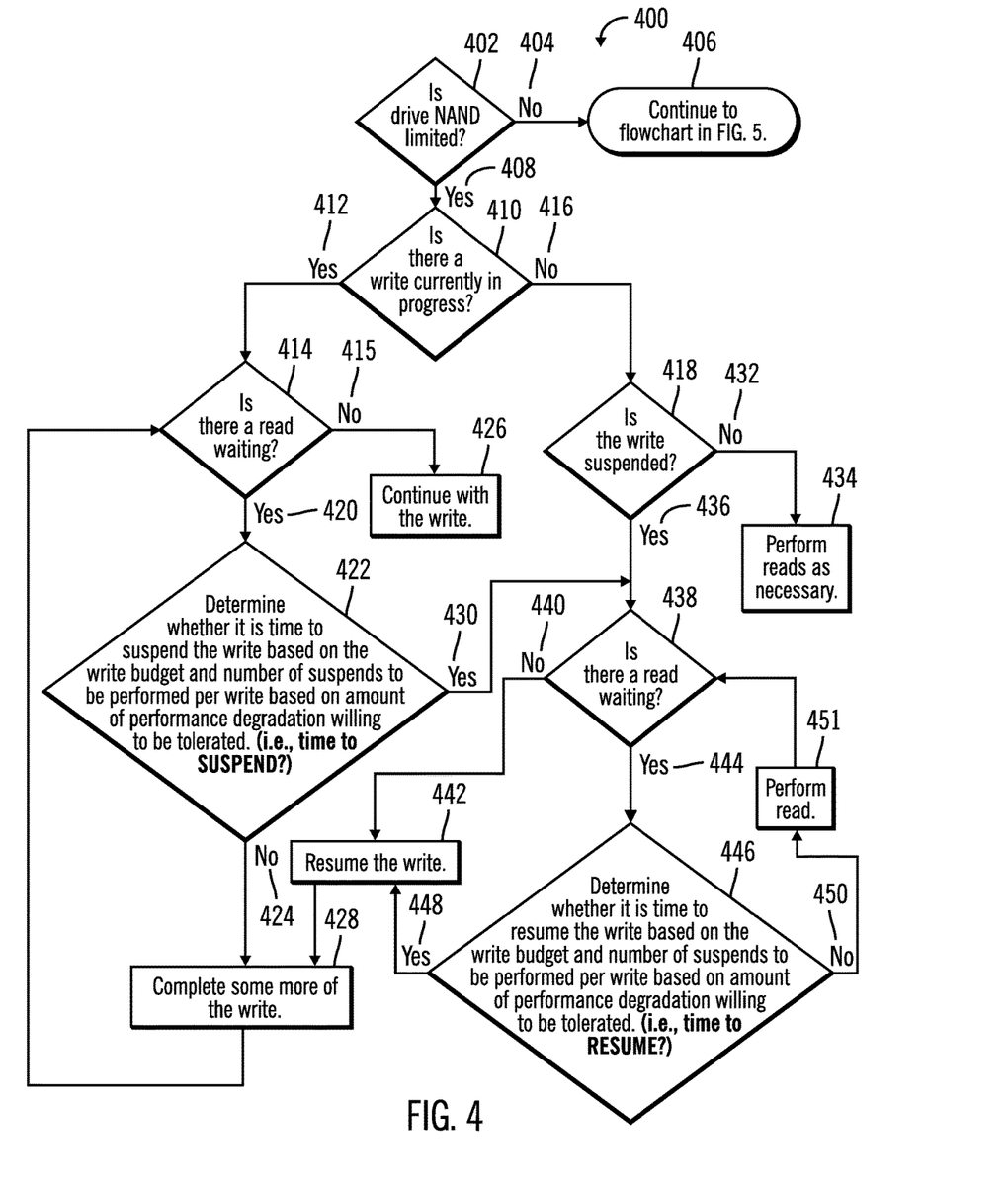
FIG. 4 illustrates a flowchart that shows operations when the SSD is NAND limited, in accordance with certain embodiments.

FIG. 4 illustrates a flowchart 400 that shows operations when the SSD 104 is NAND limited, in accordance with certain embodiments. The operations shown in FIG. 4 may be performed by the controller application 110 that executes in the controller 106 of the SSD 104.

Control starts at block 402 in which the controller application 110 determines whether the SSD 104 is NAND limited. If not ("No" branch 404) control proceeds to the flowchart of FIG. 5 (as shown via block 406).

If the controller application 110 determines that the SSD 104 is NAND limited ("Yes" branch 408) control proceeds to block 410 in which the controller application 110 determines whether there is a write currently in progress. If so ("Yes" branch 412) control proceeds to block 414, and if not ("No" branch 416) control proceeds to block 418.

At block 414, the controller application 110 determines whether there is a read waiting. If so ("Yes" branch 420) control proceeds to block 422 and if not ("No" branch 415) control proceeds to block 426 where the process continues with the write that is currently in progress as there is no read that is waiting.

At block 422 the controller application 110 determines whether it is time to suspend the write based on the write budget and the number of suspends to be performed per write based on an amount of performance degradation willing to be tolerated. If it is a not a time to suspend the write ("No" branch 424) then some more of the write that is currently in progress is completed (at block 426) and control returns to block 414 to determine once again whether a read is waiting.

If it is a time to suspend the write ("Yes" branch 430) based on the write budget and the number of suspends to be performed per write, then the write is suspended and control proceeds to block 438 in which a determination in made as to whether a read is waiting.

At block 418, the controller application 410 determines whether the write in progress is suspended. If not ("No" branch 432) reads are performed as necessary (at block 434). If the write in progress is determined to be suspended ("Yes" branch 436) the controller application 110 determines (at block 438) if a read is waiting. If a read is not waiting ("No" branch 440) control proceeds to block 442 where the previously suspended write is resumed and control proceeds to block 428.

If at block 438 the controller application 410 determines that a read is waiting ("Yes" branch 444) then control proceeds to block 446 in which the controller application 110 determines whether it is time to resume the write based on the write budget and number of suspends to be performed per write based on amount of performance degradation willing to be tolerated. If at block 446 it is determined that the write is to be resumed ("Yes branch 448) then control proceeds to block 442 in which the write is resumed.

If at block 446, the controller application 110 determines that it is not time to resume the write ("No" branch 450), the control proceeds to block 451 in which the read is performed, and then control returns to block 438 where a determination is made as to whether a read is waiting.

Therefore, FIG. 4 illustrates operations that are performed for suspension and resumption of writes and the splitting of writes into chunks, in order to allow reads to be performed when the SSD 104 is NAND limited.

Figure 5:
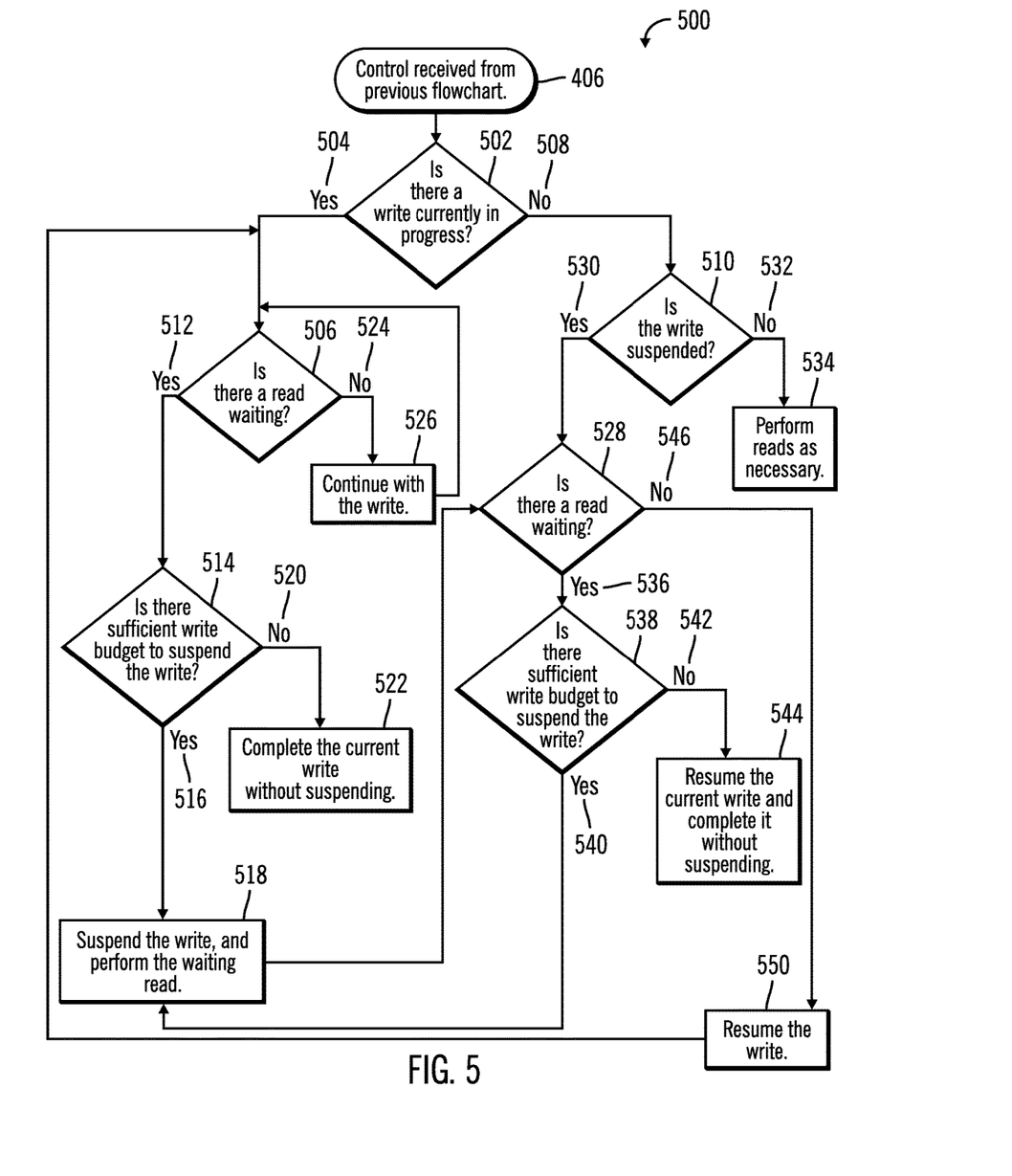
FIG. 5 illustrates a flowchart that shows operations when the SSD is not NAND limited, in accordance with certain embodiments.

FIG. 5 illustrates a flowchart 500 that shows operations when the SSD 104 is not NAND limited, in accordance with certain embodiments. The operations shown in FIG. 5 may be performed by the controller application 110 that executes in the controller 106 of the SSD 104.

The process shown in FIG. 5 starts at block 406 in which control has been received from block 402 of FIG. 4 when the SSD 104 is not NAND limited. From block 406 control proceeds to block 502 in which the controller application 110 determines whether there is a write currently in progress. If at block 502, it is determined that there is a write currently in progress ("Yes" branch 504) then a determination is made (at block 506) as to whether a read is waiting. If at block 502, it is determined that a write is not currently in progress ("No" branch 508) then a determination is made (at block 510) as to whether the write is suspended.

If there is a read waiting ("Yes" branch 512) the controller application 110 determines (at block 514) if there is sufficient write budget to suspend the write. If so ("Yes" branch 516) then the write is suspended and the read that is waiting is performed (at block 518) and control proceeds to block 528 in which a determination is made as to whether a read is waiting. If the write budget is not sufficient to suspend the write ("No" branch 520) then the current write is completed without suspending the write (at block 522).

If there is no read waiting ("No" branch 524) control proceed to block 526 in which the controller application 110 continues with the execution of the write and then control returns to block 506.

If at block 510 a determination is made that the write is suspended ("Yes" branch 530) control proceeds to block 528 to determine if there is a read that is waiting. Additionally, if at block 510, a determination is made that the write is not suspended ("No" branch 510) then reads are performed as necessary (at block 534), If there is a read waiting ("Yes" branch 536) control proceeds to block 538 in which the controller application 110 determines if there is a sufficient write budget to suspend the write. If so ("Yes" branch 540) then the write is suspended (at block 518). If not ("No" branch 542) then the current write is resumed and completed without suspensions (at block 544).

If at block 528 it is determined that there is no read that is waiting ("No" branch 546) then control proceeds to block 550 in which the controller application 110 resumes the write, and then control returns to block 506.

Therefore, FIG. 5 illustrates operations that are performed for suspension and resumption of writes to allow reads to be performed when the SSD 104 is not NAND limited.

FIGS. 2-5 have discussed the performing of read commands by suspending a write commands and splitting the write command into chunks and executing read commands in between the execution of the write chunks. Operations analogous to those shown in FIGS. 2-5 may also be performed when erase commands are suspended and resumed to allow read commands to go through.

Figure 6:
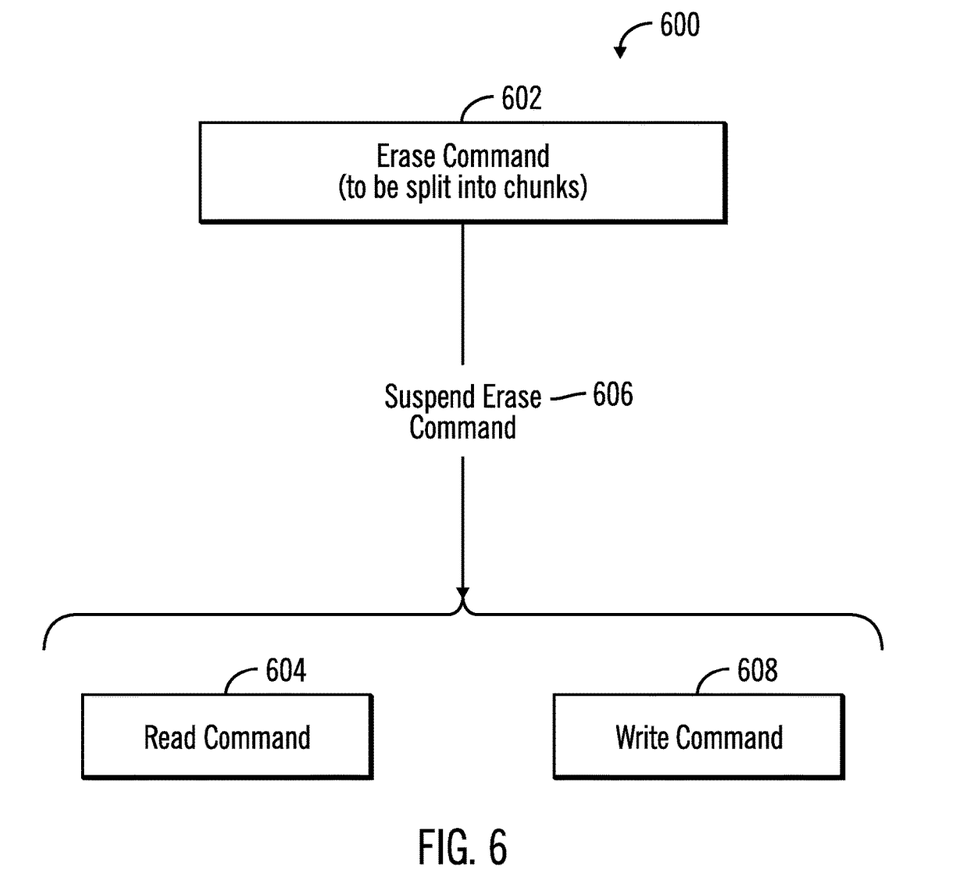
FIG. 6 illustrates a block diagram that shows suspension of erase commands to process write and read commands, in accordance with certain embodiments.

FIG. 6 illustrates a block diagram 600 that shows suspension of erase commands to process write and read commands, in accordance with certain embodiments. The operations shown in FIG. 6 may be performed by the controller application 110 that executes in the controller 106 of the SSD 104.

In FIG. 6 the erase command 602 may be split into a plurality of chunks. When a read command 604 arrives, then the erase command 602 may be suspended 606 and split into chunks, and the read command 604 may be executed (in between execution of the chunks.

Similarly, in certain embodiments when a write command 608 arrives then the erase command 602 may be suspended and broken into chunks, and the write command 608 may be executed. It may be noted that writes are performed asynchronously in the SSD 104, and the controller application 110 may inform the host 102 that the writes have completed even when the performing of the writes have actually not been completed in the SSD 104.

Figure 7:
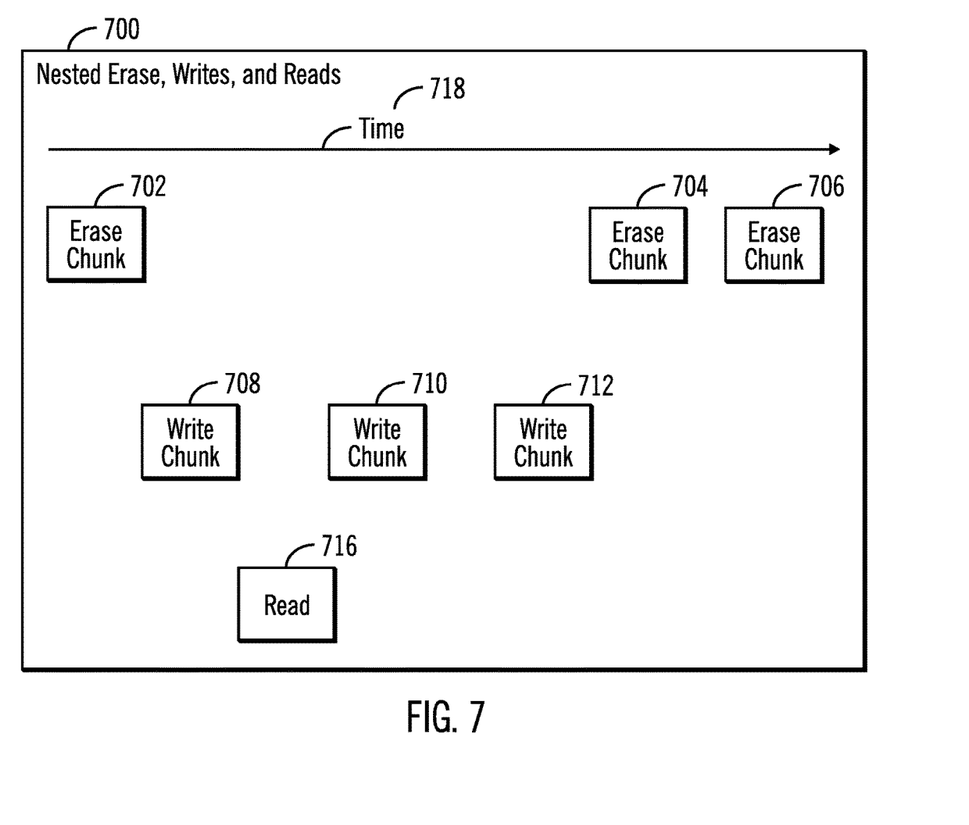
FIG. 7 illustrates a block diagram that shows write commands being performed within suspended erase commands, and read commands being performed within suspended write commands, in accordance with certain embodiments.

FIG. 7 illustrates a block diagram 700 that shows write commands being performed within suspended erase commands, and read commands being performed within suspended write commands, in accordance with certain embodiments. The operations shown in FIG. 7 may be performed by the controller application 110 that executes in the controller 106 of the SSD 104.

In FIG. 7, the erase command has been split into a plurality of chunks 702, 704, 706 and a write command has been split into a plurality of chunks 708, 710. 712. The read command 716 is executed in between write chunks 708 and 710 as shown below the horizontal arrow 718 that indicates the progress of time. The write chunks 708, 710, 712 are executed between the erase chunks 702, 704.

Therefore, FIGS. 6-7 illustrates how reads and/or writes are nested within the execution of erases. It should be noted that both erases and the performing of writes may have to be suspended during the execution of reads, and this may be referred to as a "nested suspend" state.

Figure 8:
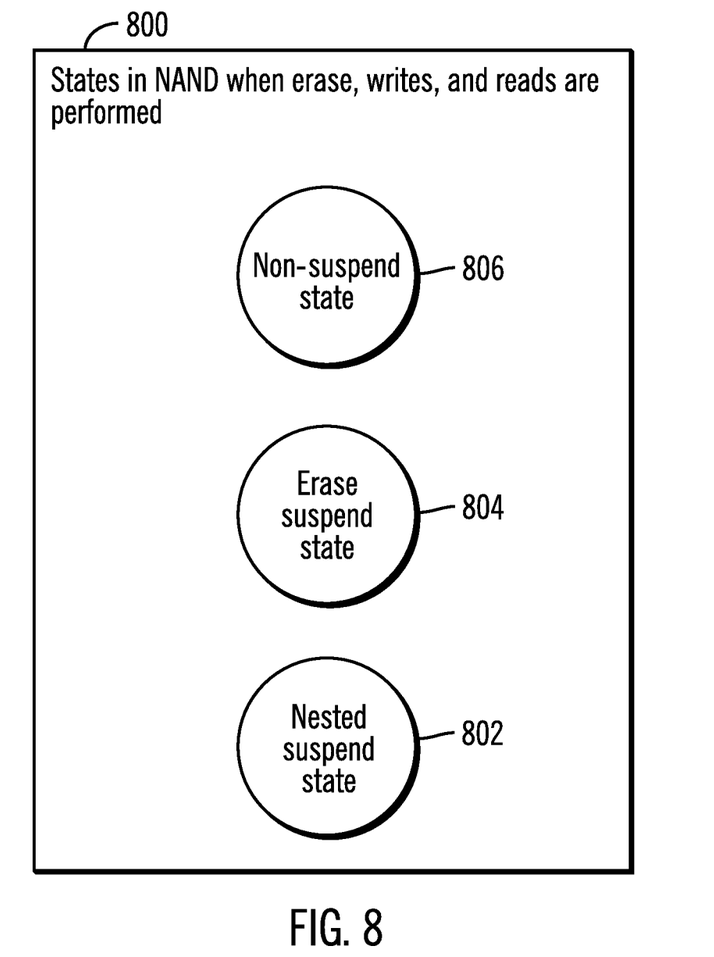
FIG. 8 illustrates a block diagram of states in a NAND, in accordance with certain embodiments.

FIG. 8 illustrates a block diagram 800 of states in a NAND, in accordance with certain embodiments. Nested suspend state 804, erase suspend state 806, and a non-suspend state 806 are shown in FIG. 8. In certain embodiments, the controller application 110 may be able to suspend both the erase and the write while the read is being executed. In other embodiments, additional nested suspend features may be implemented in a NAND memory to allow a host 102 to suspend a performing of a write after erase is suspended. In certain embodiments of the SSD 104, this feature is enabled by a set feature option or by an MLbi (trim) option. The host 102 may need to issue a write resume to exit out of a nested suspend state 802. Also, the host 102 needs to keep track of suspended state (erase suspend 804 or write suspend) in a nested suspended state. Regular erase, auto erase suspend or erase resume operations are invalid until the NAND exits out of nested suspend state 802. In certain embodiments, the write resume from the host 102 may be performed by the host 102 by commands that are in accordance with specific hardware implementations of the SSD 104.

Figure 9:
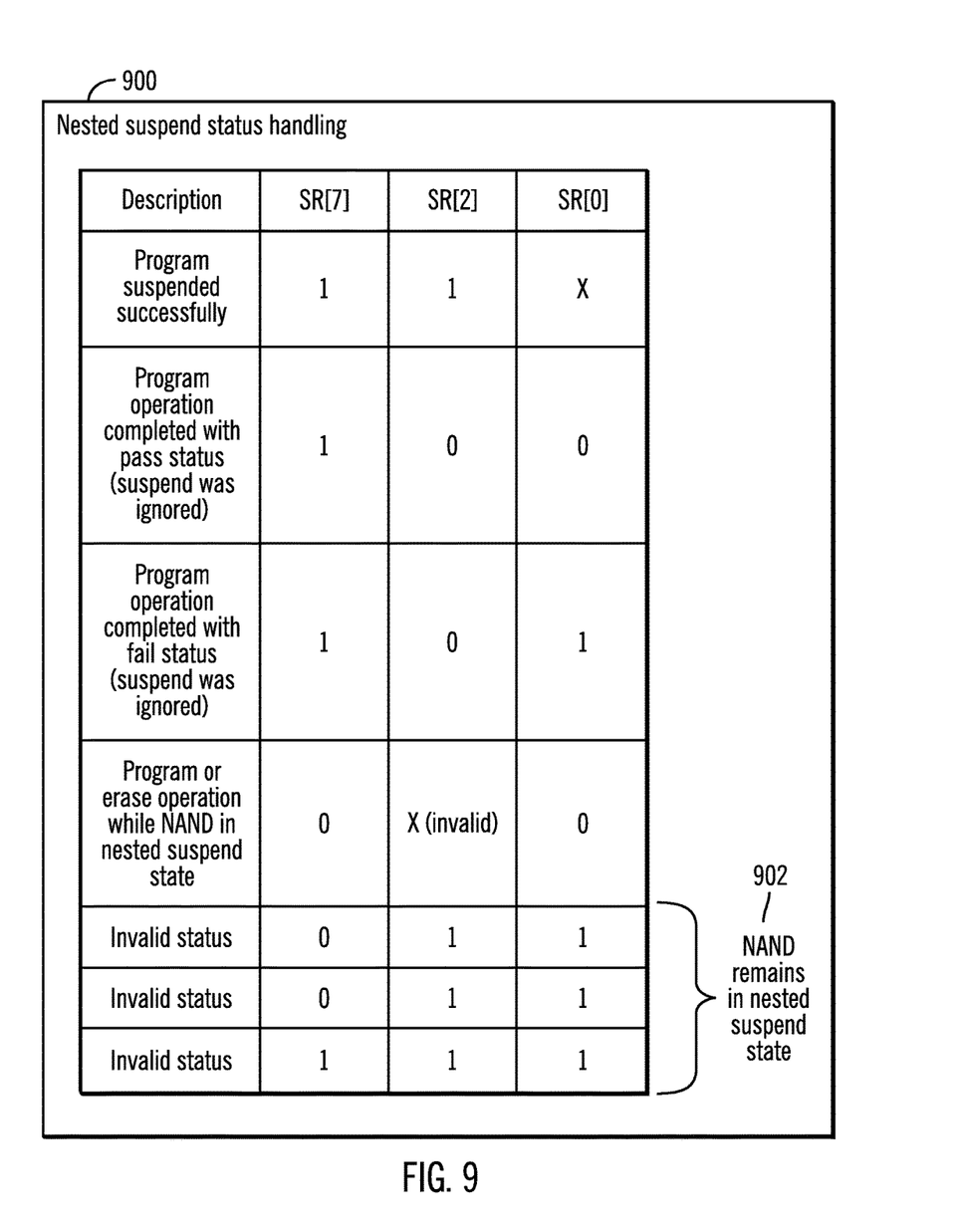
FIG. 9 illustrates a block diagram of nested suspend status handling in a NAND, in accordance with certain embodiments.

FIG. 9 illustrates a block diagram 900 of nested suspend status handling in a NAND, in accordance with certain embodiments. In certain embodiments, the NAND has special status bits to report suspend which is shared between write and erase suspend. During nested suspend 902, this status bit is alive only after suspend operation until the next command is issued on NAND interface. The programming of the bits in which the NAND remains in nested suspend state is shown via reference numeral 902.

Figure 10:
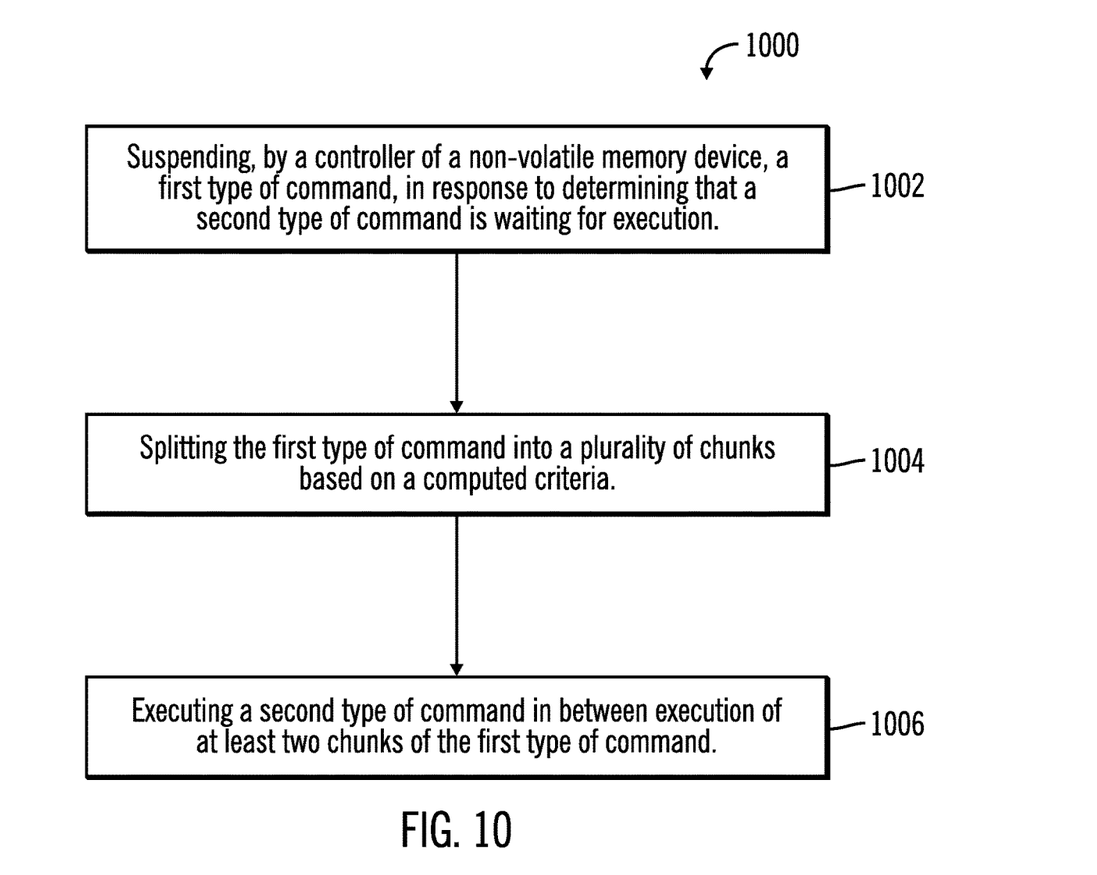
FIG. 10 illustrates a flowchart for performing nested Input/Output (I/O) operations in a SSD, in accordance with certain embodiments.

FIG. 10 illustrates a flowchart 1000 for nested suspend and resume in a SSD 104, in accordance with certain embodiments. The operations shown in FIG. 10 may be performed by the controller application 110 that executes in the SSD 104.

Control starts at block 1002, in which a first type of command (e.g., a write command) is suspended, by a controller 106 of a non-volatile memory device, in response to determining that a second type of command (e.g., a read command) is waiting for execution. The first type of command (e.g., a write command) is split (at block 1004) into a plurality of chunks (e.g., write chunks) based on a computed criteria. A second type of command (e.g., read command) is executed (at block 1006) in between execution of at least two chunks of the first type of command.

In certain embodiments a third type of command (e.g., erase command) is suspended and split into a plurality of chunks (e.g., erase chunks), prior to executing the second type of command (e.g., read command) in between execution of at least two chunks of the first type of command (e.g., write command) and the third type of command (e.g., erase command).

Therefore, FIGS. 1-10 illustrate certain embodiments for improving the QoS for read operations in a SSD by suspending and splitting into chunks the erase and/or write operations.

The described operations may be implemented as a method, apparatus or computer program product using standard programming and/or engineering techniques to produce software, firmware, hardware, or any combination thereof. The described operations may be implemented as code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals. Those skilled in the art will recognize that many modifications may be made to this configuration, and that the article of manufacture may comprise suitable information bearing medium known in the art.

Computer program code for carrying out operations for aspects of the certain embodiments may be written in any combination of one or more programming languages. Blocks of the flowchart and block diagrams may be implemented by computer program instructions.

Figure 11:
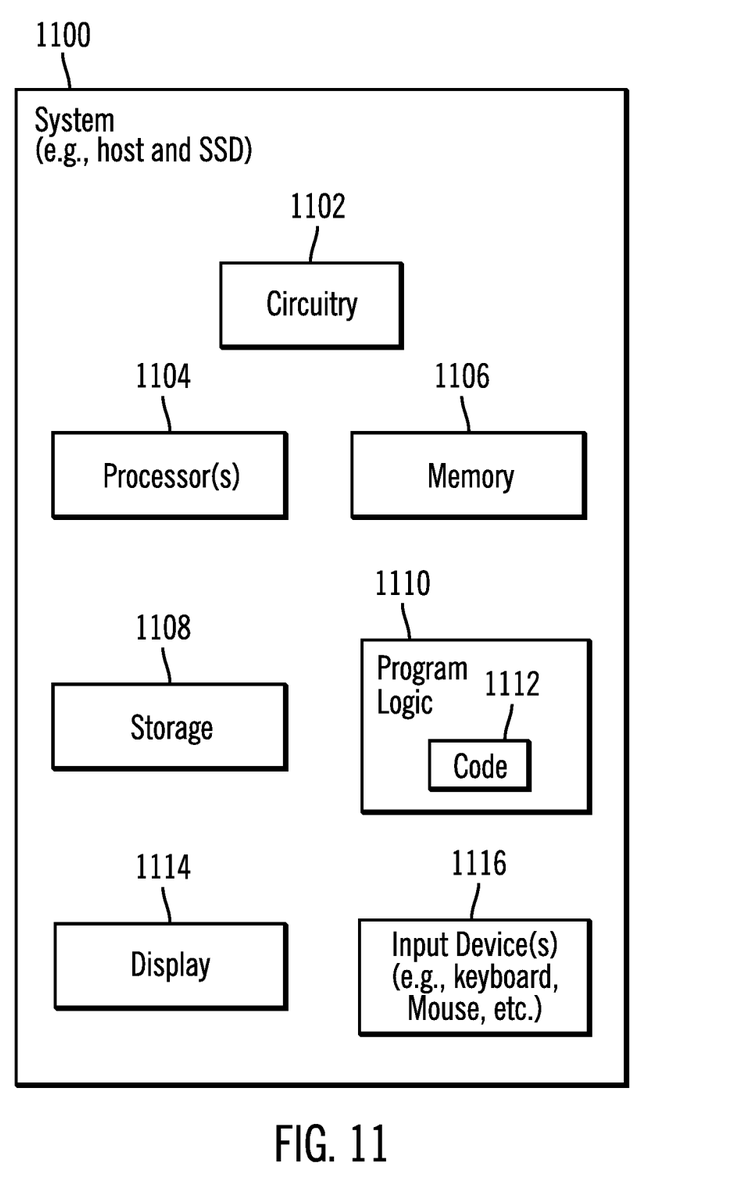
FIG. 11 illustrates a block diagram of a system, in accordance with certain embodiments.

FIG. 11 illustrates a block diagram of a system 1100 that includes both the host 102 (the host 102 comprises at least a processor) and the solid state drive 104, in accordance with certain embodiments. For example, in certain embodiments the system 1100 may be a computer (e.g., a laptop computer, a desktop computer, a tablet, a cell phone or any other suitable computational device) that has the host 102 and the solid state drive 104 both included in the system 1100. For example, in certain embodiments the system 1100 may be a laptop computer that includes the solid state drive 102. The system 1100 may include a circuitry 1102 that may in certain embodiments include at least a processor 1104. The system 1100 may also include a memory 1106 (e.g., a volatile memory device), and storage 1108. The storage 1108 may include the solid state drive 104 or other drives or devices including a non-volatile memory device (e.g., EEPROM, ROM, PROM, flash, firmware, programmable logic, etc.). The storage 1108 may also include a magnetic disk drive, an optical disk drive, a tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. Therefore, while FIG. 11 shows the program logic 1110 separately from the other elements, the program logic 1110 may be implemented in the memory 1106 and/or the circuitry 1102. The system 1100 may also include a display 1114 (e.g., an liquid crystal display (LCD), a light emitting diode (LED) display, a cathode ray tube (CRT) display, a touchscreen display, or any other suitable display). The system 1100 may also include one or more input devices 1116, such as, a keyboard, a mouse, a joystick, a trackpad, or any other suitable input devices). Other components or devices beyond those shown in FIG. 11 may also be found in the system 1100.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

Examples

The following examples pertain to further embodiments.

Example 1 is a method for nested suspend and resume. A controller of a non-volatile memory device suspends a first type of command, in response to determining that a second type of command is waiting for execution. The first type of command is split into a plurality of chunks based on a computed criteria. A second type of command is executed in between execution of at least two chunks of the first type of command.

In example 2, the subject matter of example 1 may include that the first type of command is a write command, and that the second type of command is a read command.

In example 3, the subject matter of example 2 may include that the write command is a current write command. The computed criteria is determined based on a write budget that is a difference of a time remaining before starting execution of a next write command and a time left for completing the current write command.

In example 4, the subject matter of example 3 may include that the non-volatile memory device is limited by a bandwidth of a non-volatile memory of the non-volatile memory device. The computed criteria is determined, based on a number of suspends to be performed per write command.

In example 5, the subject matter of example 1 may include that the first type of command is an erase command, and that the second type of command is a read command.

In example 6, the subject matter of example 1 may include suspending a third type of command and splitting the third type of command into a plurality of chunks, prior to executing the second type of command in between execution of at least two chunks of the first type of command and the third type of command.

In example 7, the subject matter example 6 may include that the first type of command is a write command, the second type of command is a read command, and that the third type of command is an erase command.

In example 8, the subject matter of example 7 may include configuring the non-volatile memory device to simultaneously maintain suspended states for both the erase command and the write command.

Example 9 is an apparatus for nested suspend and resume. The apparatus comprises a non-volatile memory, an a controller, wherein the controller controls the non-volatile memory, and wherein the controller is operable to suspend a first type of command, in response to determining that a second type of command is waiting for execution. The controller is also operable to split the first type of command into a plurality of chunks based on a computed criteria, and to execute a second type of command in between execution of at least two chunks of the first type of command.

In example 10, the subject matter of example 9 may include that the first type of command is a write command, and that the second type of command is a read command.

In example 11, the subject matter of example 10 may include that the write command is a current write command. The controller is further operable to determine the computed criteria based on a write budget that is a difference of a time remaining before starting execution of a next write command and a time left for completing the current write command.

In example 12, the subject matter of example 11 may include that the apparatus is limited by a bandwidth of a non-volatile memory of the apparatus. The controller is further operable to determine the computed criteria also based on a number of suspends to be performed per write command.

In example 13, the subject matter of example 9 may include that the first type of command is an erase command, and that the second type of command is a read command.

In example 14, the subject matter of example 9 may include that the controller is operable to suspend a third type of command and split the third type of command into a plurality of chunks, prior to executing the second type of command in between execution of at least two chunks of the first type of command and the third type of command.

In example 15, the subject matter of example 14 may include that the first type of command is a write command, the second type of command is a read command, and that the third type of command is an erase command.

In example 16, the subject matter of example 15 may include that the controller is further operable to simultaneously maintain suspended states for both the erase command and the write command.

Example 17 is a system for nested suspend and resume. The system comprises a solid state drive (SSD) comprising a plurality of non-volatile memory, a display, and a processor coupled to the SSD and the display, where the SSD is operable to suspend a first type of command, in response to determining that a second type of command is waiting for execution. The SSD is also operable to split the first type of command into a plurality of chunks based on a computed criteria, and to execute a second type of command in between execution of at least two chunks of the first type of command.

In example 18, the subject matter of example 17 may include that the first type of command is a write command, and that the second type of command is a read command.

In example 19, the subject matter of example 18 may include that the write command is a current write command. The SSD is further operable to determine the computed criteria based on a write budget that is a difference of a time remaining before starting execution of a next write command and a time left for completing the current write command.

In example 20, the subject matter of example 17 may include that the SSD is limited by a bandwidth of a non-volatile memory of the SSD. The SSD is further operable to determine the computed criteria also based on a number of suspends to be performed per write command.

In example 21, the subject matter of example 17 may include that the first type of command is an erase command, and that the second type of command is a read command.

In example 22, the subject matter of example 17 may include that the SSD is operable to suspend a third type of command and split the third type of command into a plurality of chunks, prior to executing the second type of command in between execution of at least two chunks of the first type of command and the third type of command.

In example 23, the subject matter of example 22 may include that the first type of command is a write command, the second type of command is a read command, and that the third type of command is an erase command.

In example 24, the subject matter of example 23 may include that the SSD is further operable to simultaneously maintain suspended states for both the erase command and the write command.

Example 25 is a system for nested suspend and resume. The system comprises means for suspending, by a controller of a non-volatile memory device, a first type of command, in response to determining that a second type of command is waiting for execution. The system also comprises means for splitting the first type of command into a plurality of chunks based on a computed criteria, and means for executing a second type of command in between execution of at least two chunks of the first type of command.

What is claimed is:

1. A method, comprising:
   suspending, by a controller of a non-volatile memory device, a current write command, in response to determining that a read command is waiting for execution;
   splitting the current write command into a plurality of chunks based on a computed criteria; and
   executing a read command in between execution of at least two chunks of the current write command, wherein resumption of the current write command is also based on the computed criteria, and wherein the computed criteria is based on a write budget that is a difference of a time remaining before starting execution of a next write command and a time left for completing the current write command, and based on a number of suspends to be performed per write command, and also based on a performance degradation tolerable in the non-volatile memory device to increase a latency of the read command that is waiting for execution.

2. The method of claim 1, wherein the current write command is a first type of command, and the read command is a second type of command, the method further comprising:
   suspending a third type of command and splitting the third type of command into a plurality of chunks, prior to executing the second type of command in between execution of at least two chunks of the first type of command and the third type of command.

3. The method of claim 2, wherein:
   the third type of command is an erase command.

4. The method of claim 3, the method further comprising:
   configuring the non-volatile memory device to simultaneously maintain suspended states for both the erase command and the current write command.

5. The method of claim 1, wherein the suspending, the splitting and the executing are performed in response to determining that the non-volatile memory device is limited by a bandwidth of non-volatile memory included in the non-volatile memory device.

6. The method of claim 1, wherein the controller adjusts a number of suspends of the current write command and a number of the plurality of chunks to provide a required quality of service and a required performance.

7. The method of claim 6, wherein the controller increases the number of the plurality of chunks to increase a quality of service.

8. The method of claim 6, wherein the controller decreases the number of the plurality of chunks to improve performance.

9. An apparatus, comprising:
   a non-volatile memory; and
   a controller, wherein the controller controls the non-volatile memory, and wherein the controller is operable to:
   suspend a current write command, in response to determining that a read command is waiting for execution;
   split the current write command into a plurality of chunks based on a computed criteria; and
   execute a read command in between execution of at least two chunks of the current write command, wherein resumption of the current write command is also based on the computed criteria, and wherein the computed criteria is based on a write budget that is a difference of a time remaining before starting execution of a next write command and a time left for completion of the current write command, and based on a number of suspends to be performed per write command, and also based on a performance degradation that is tolerable to increase a latency of the read command that is waiting for execution.

10. The apparatus of claim 9, wherein the current write command is a first type of command, and the read command is a second type of command, wherein the controller is further operable to:
    suspend a third type of command and split the third type of command into a plurality of chunks, prior to executing the second type of command in between execution of at least two chunks of the first type of command and the third type of command.

11. The apparatus of claim 10, wherein:
    the third type of command is an erase command.

12. The apparatus of claim 11, wherein the controller is further operable to:
    simultaneously maintain suspended states for both the erase command and the current write command.

13. The apparatus of claim 9, wherein the suspend, the split, and the execute are performed in response to a determination that the apparatus is limited by a bandwidth of non-volatile memory included in the apparatus.

14. The apparatus of claim 9, wherein the controller adjusts a number of suspends of the current write command and a number of the plurality of chunks to provide a required quality of service and a required performance.

15. The apparatus of claim 14, wherein the controller is operable to increase the number of the plurality of chunks to increase a quality of service.

16. The apparatus of claim 14, wherein the controller is operable to decrease the number of the plurality of chunks to improve performance.

17. A system, comprising:
    a solid state drive (SSD) comprising a plurality of non-volatile memory;
    a display; and
    a processor coupled to the SSD and the display, wherein the SSD is operable to:
    suspend a current write command, in response to determining that a read command is waiting for execution;

split the current write command into a plurality of chunks based on a computed criteria; and execute a read command in between execution of at least two chunks of the current write command, wherein resumption of the current write command is also based on the computed criteria, and wherein the computed criteria is based on a write budget that is a difference of a time remaining before starting execution of a next write command and a time left for completion of the current write command, and based on a number of suspends to be performed per write command, and also based on a performance degradation tolerable in the SSD to increase a latency of the read command that is waiting for execution.

18. The system of claim 17, wherein the current write command is a first type of command, and the read command is a second type of command, wherein the SSD is further operable to:

suspend a third type of command and split the third type of command into a plurality of chunks, prior to executing the second type of command in between execution of at least two chunks of the first type of command and the third type of command.

19. The system of claim 18, wherein:
the third type of command is an erase command.

20. The system of claim 19, wherein the SSD is further operable to:

simultaneously maintain suspended states for both the erase command and the current write command.

21. The system of claim 17, wherein the suspend, the split, and the execute are performed in response to a determination that the SSD is limited by a bandwidth of non-volatile memory included in the SSD.

22. The system of claim 17, wherein the SSD is operable to adjust a number of suspends of the current write command and a number of the plurality of chunks to provide a required quality of service and a required performance.

23. The system of claim 22, wherein the SSD in configurable to increase the number of the plurality of chunks to increase a quality of service.

24. The system of claim 22, wherein the SSD is configurable to decrease the number of the plurality of chunks to improve performance.

* * * * *